July 14, 1925.
G. M. EATON
1,545,747
VEHICLE BODY SUPPORT
Filed May 24, 1921   2 Sheets-Sheet 1
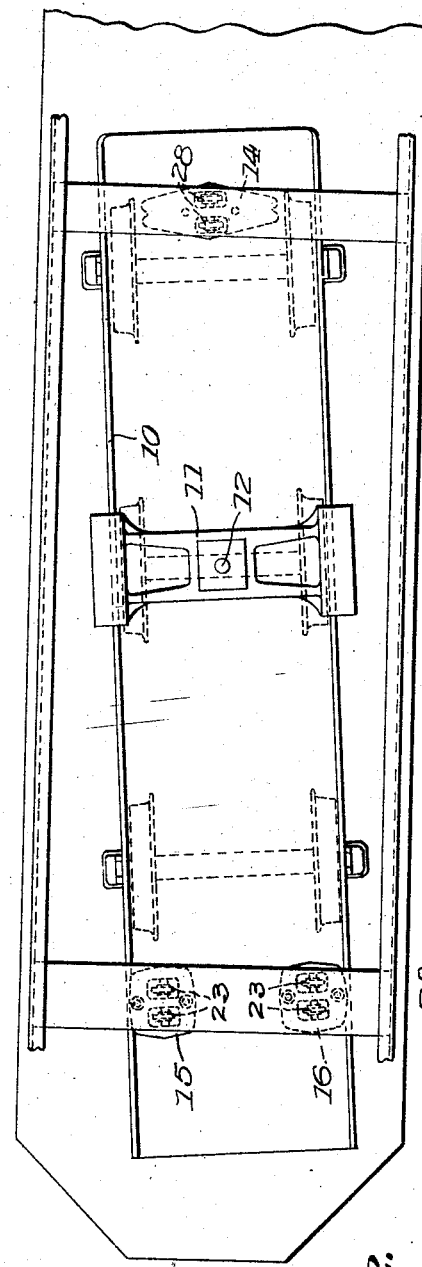
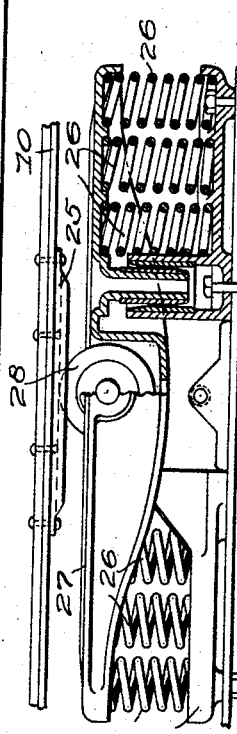
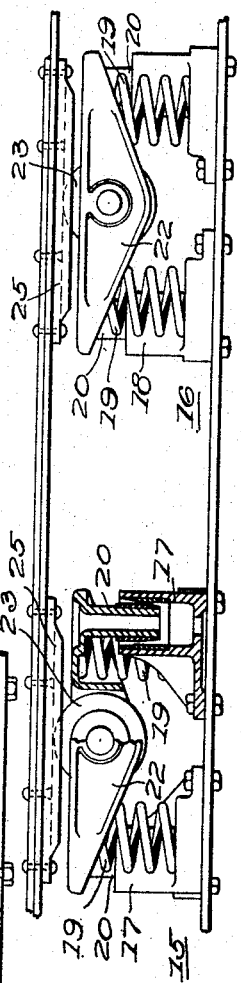
WITNESSES:
R. S. Harrison
A. Martin
INVENTOR
George M. Eaton,
BY
Wesley S. Carr
ATTORNEY July 14, 1925.

G. M. EATON 1,545,747

VEHICLE BODY SUPPORT

Filed May 24, 1921

WITNESSES:
R. S. Harrison
A. Martin

INVENTOR
George M. Eaton,
BY
Wesley G. Carr
ATTORNEY

Patented July 14, 1925.

1,545,747

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

VEHICLE BODY SUPPORT.

Application filed May 24, 1921. Serial No. 472,117.

*To all whom it may concern:*

Be it known that I, GEORGE M. EATON, a citizen of the United States, and a resident of Pittsburgh, in the county of Allegheny and State of Pennsylvania, have invented a new and useful Improvement in Vehicle Body Supports, of which the following is a specification.

My invention relates to supports for vehicle bodies and more particularly to means whereby vehicle bodies are supported upon their running gears.

My invention is particularly applicable to a locomotive of that form wherein the body is pivoted to the truck frame in such manner as to permit relative movement therebetween, in a horizontal plane, and is designed to eliminate the friction that ordinarily takes place between the opposing bearing faces of the truck and the cab when the locomotive is rounding a curve.

Another object of my invention is to simplify and improve generally the mounting of a cab upon its trucks, to effectually distribute the weight thereof on the trucks and to provide an improved form of spring support for the cab body.

In cases where the cab body is pivotally supported on a truck, the pivot is located intermediate the ends of the cab body. Usually, the desired weight distribution at the rail necessitates the employment of bearing faces between the cab and the truck at points adjacent to the ends of the trucks. These bearing faces are composed of flat plates, but, owing to the excessive amount of friction that takes place between the opposing plates, when relative movement occurs between the cab and the truck at curves in the track, the truck cannot rotate freely enough around the center pin to properly adjust itself to such curves. This condition has resulted in excessive wear between the flanges of the truck wheels and the edges of the rails.

My invention overcomes the above noted objection to the previous forms of construction, by providing anti-friction bearings located between the cab body and the truck at points adjacent to the ends of the cab.

As shown in the accompanying drawings;

Figure 1 is a view, partially in top plan and partially in section, of a portion of a locomotive embodying my invention.

Fig. 2 is a view, partially in end elevation and partially in section, of one of the supporting members for the cab body.

Fig. 3 is a similar view of another of the supporting members, looking from the left of Fig. 1.

Figure 4:
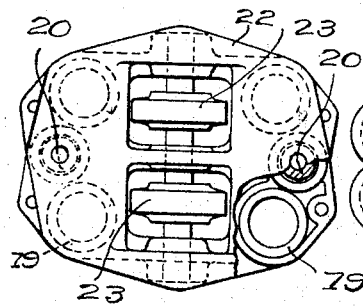
Figs. 4 and 5 are plan views of the devices of Figs. 2 and 3, respectively.
Figure 5:
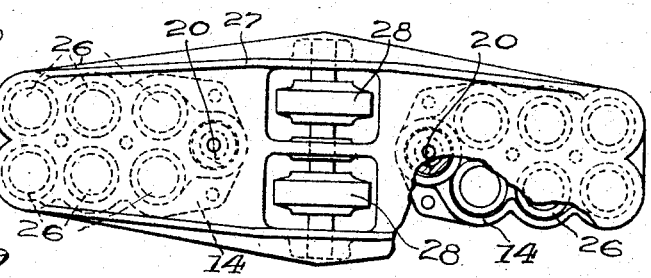

In Fig. 1 I have shown one end of a cab body 9 supported by a truck frame 10. The other end of the cab body 9 may be provided with a truck identical in construction with that which will now be described.

The cab body 9 is connected to the truck bolster 11 by the usual center pin 12 to permit of rotative movement by the truck in a horizontal plane.

In order to distribute the weight of the body upon the truck, bearings 14, 15 and 16 are provided. The bearings 15 and 16, which are mounted upon the front end of the truck, are provided with seating blocks and spring housing members 17 and 18, respectively, that support compression springs 19. Bearings 15 and 16 are also provided with plunger guides 20 that serve to maintain the springs 19 against lateral displacement. The brackets 22 are supported on the upper ends of the springs 19 and are each provided with a pair of rollers 23.

The under side of the cab body is provided with bearing plates 25 that lie directly above the rollers 23 and 28.

The bearing 14 at the other end of the truck frame 10 is of substantially the same construction as are the bearings 15 and 16, it being provided with springs 26, brackets 27 and rollers 28.

If desired, the weight of the cab body 9 may be borne entirely by the bearings 14, 15 and 16 and, as above explained, truck frames provided with the form of bearings just described may be applied adjacent to each end of the locomotive, or, in cases where more than two trucks are employed, each truck may be provided with a three-point yielding supporting structure for the cab body.

From the foregoing description, it will be apparent that when the locomotive enters a curve in the track, the roller bearings permit the truck to swing freely, as illustrated in Fig. 1, to adjust itself to the curve.

It will be further apparent that the three-point support permits the truck to adapt itself to irregularities in the track without materially affecting the distribution of the weight thereupon.

Figure 6:
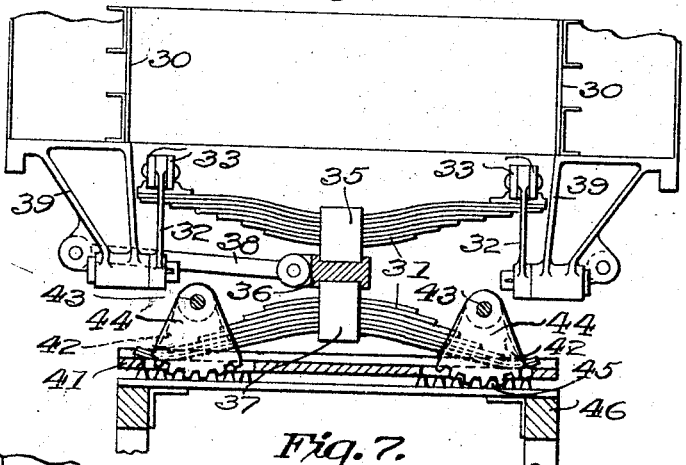
Fig. 6 is a view, partially in end elevation and partially in section, of a modified form of support for the cab
Figure 7:
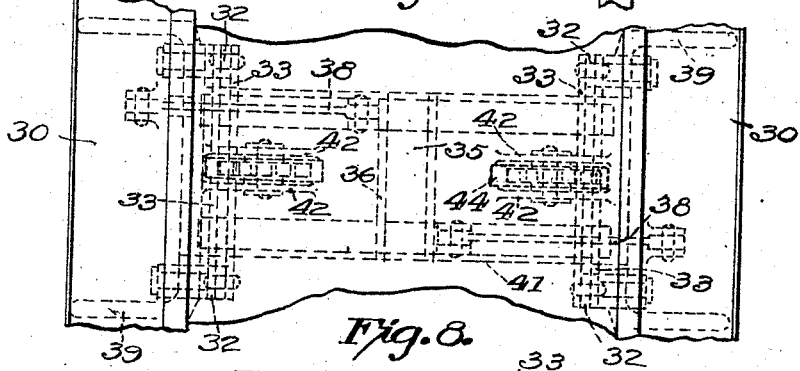
Figs. 7 and 8 are plan and end elevational views, respectively, of the device of Fig. 6.
Figure 8:
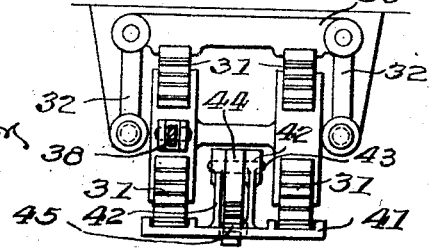

Referring now to Figs. 6, 7 and 8, a cab body 30 may be supported upon each truck by one or more sets of semi-elliptical springs 31, there being four of such springs in each set, in the construction here illustrated.

The body 30 is supported from the upper pair of springs 31 by means of four hangers 32 that have their upper ends connected by cross bars 33.

The upper springs are secured to blocks 35 that rest upon a block 36 which is, in turn, supported by blocks 37 that are carried by the lower springs. The blocks 36 serves to tie the blocks 35 and the blocks 37 together and to thus maintain the springs 31 in proper alignment. Links 38 are each secured, at one end, to the block 36 and, at the other end, to sill members 39 of the cab body 30. The links 38 serve to brace the springs against end thrusts that occur when there is relative horizontal movement between the truck frame and the cab body.

The lower springs 31 rest upon a cradle 41 that is supported, through its upstanding portions 42 and pivots 43, upon segmental toothed rollers 44. The teeth of the rollers 44 extend through the bottom of the cradle 41 and mesh with teeth on a rack 45 that is supported upon a truck frame 46.

By means of the construction just described, the truck frame 46 is permitted to move readily with respect to the cab body 30, in a horizontal plane, as in the construction illustrated in Figs. 1 to 5, inclusive.

From the foregoing description, it will be apparent that I have provided a construction wherein the truck may move readily with respect to the cab body, both in vertical and horizontal planes, and that substantially uniform distribution of weight is maintained throughout such movements.

It will be apparent that various modifications in detail and general arrangement may be made without departing from the spirit of the invention, as defined in the accompanying claims.

I claim as my invention:

1. A vehicle-body-supporting structure comprising a truck frame, anti-friction bearings interposed between the body and the truck frame and a yielding element beneath each of the anti-friction bearings, two of the bearings being located adjacent to one end of the truck frame and a third bearing being located adjacent to the other end of the truck frame.

2. A supporting structure for a vehicle body comprising a truck frame, anti-friction bearings interposed between the body and the truck frame adjacent to each end of the said frame, and a yielding element for supporting each anti-friction bearing.

3. A vehicle-body-supporting structure comprising, in combination, a truck frame that is movable horizontally with respect to the body, a pair of laterally spaced yielding members interposed between the body and the truck frame adjacent to one end of the truck frame and a yielding element interposed between the body and the truck frame adjacent to the longitudinal center line of the truck frame at the other end of such frame.

4. A vehicle-body-supporting structure comprising, in combination, a truck frame, a pair of laterally spaced yielding members interposed between the body and the truck frame, adjacent to one end of the truck frame, a yielding element interposed between the body and the truck frame, at the other end of the latter, and anti-friction members supported by the yielding members.

5. A supporting structure for a vehicle body comprising, in combination, a truck frame, a pivotal connection between the body and the truck frame adjacent to the middle of the frame and anti-friction bearings interposed between the body and the truck frame at points adjacent to the ends of the said frame.

6. In combination, in a vehicle, a body member, a truck member, yielding supporting elements carried by one of said members and anti-friction bearings interposed between the other one of said members and the yielding elements adjacent to the ends of the truck member.

7. In combination, in a vehicle, a body member, a truck member, means for limiting relative horizontal movements between the body member and the truck member, yielding supporting elements carried by one of said members, at points adjacent to the ends of the truck member, and anti-friction bearings interposed between the other one of said members and the yielding elements.

8. In combination, in a vehicle, a body member, a truck member, yielding supporting elements interposed between the said members, at points adjacent to the ends of the truck member, and anti-friction elements interposed between one of said members and the yielding elements.

9. In combination, in a vehicle, a body member, a truck member, yielding elements interposed between the said members adjacent to one end of the truck member and anti-friction bearings interposed between said members adjacent to the other end of the truck member, the truck and body members being pivotally connected for relative movement horizontally.

In testimony whereof, I have hereunto subscribed my name this 19th day of May, 1921.

GEORGE M. EATON.